Figure 1:
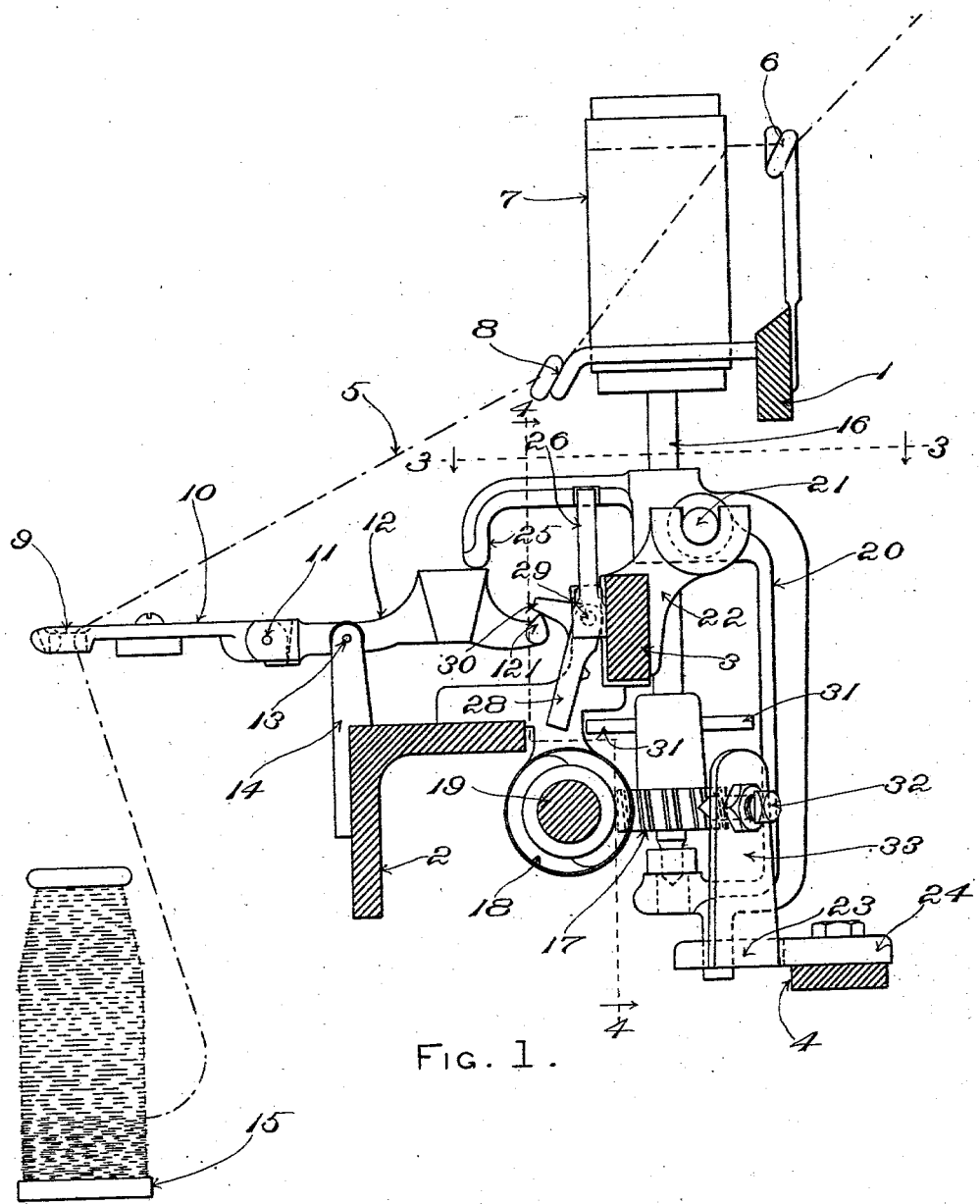

No. 753,338. PATENTED MAR. 1, 1904.
C. WHITAKER.
STOP MOTION FOR TWISTING FRAMES.
APPLICATION FILED JAN. 29, 1902. RENEWED JAN. 27, 1904.
NO MODEL. 3 SHEETS—SHEET 3.

WITNESSES.
Channing Whitaker, Jr.
Edwin F. Samuels.

INVENTOR.
Channing Whitaker.

No. 753,338. Patented March 1, 1904.

UNITED STATES PATENT OFFICE.

CHANNING WHITAKER, OF TYNGSBORO, MASSACHUSETTS, ASSIGNOR TO LOWELL MACHINE SHOP, OF LOWELL, MASSACHUSETTS, A CORPORATION OF MASSACHUSETTS.

STOP-MOTION FOR TWISTING-FRAMES.

SPECIFICATION forming part of Letters Patent No. 753,338, dated March 1, 1904.

Application filed January 29, 1902. Renewed January 27, 1904. Serial No. 190,898. (No model.)

*To all whom it may concern:*

Be it known that I, CHANNING WHITAKER, of Tyngsboro, in the county of Middlesex, State of Massachusetts, have invented an Improvement in Stop-Motions for Twisting-Frames, of which the following is a description, reference being had therein to the accompanying drawings.

My invention relates to the means which is employed in twisting and other frames for the purpose of trapping ends which break between the delivery-rollers and the receiving-bobbins on the spindles and preventing waste by arresting the delivery of such ends by the said delivery-rollers, and is an improvement upon that which is embodied in the United States Patent to Prince Smith, Jr., and Smith Ambler, No. 388,509, August 28, 1888. In this paragraph the letters of reference are those of that patent. In the invention of that patent a lever or latch $m$, which is pivoted upon the fixed stud $n$, rests upon the roller-beam $h$ and by supporting the arm $c^2$ of the swing-frame $c$ maintains the swing-frame in operative position. When upon the breaking of a thread the rear end of the trap-lever $j$ falls, it carries the trigger $j^2$ into the path of motion of the rotating projections $f^2 f^2$. When either of the projections $f^2 f^2$ strikes the trigger $j^2$, it knocks it around about the vertical pivot $j^3$. The middle portion of the trigger $j^2$ then collides with the latch $m$, knocks it from beneath the arm $c^2$, and springs the trap. The trigger $j^2$ is of comparatively long and slender design. When in use, it frequently breaks at about the middle of its length, due to the shock which attends its collision with the latch $m$, and the expense for repairs is considerable.

The object of my improvement is to prevent such breakages and expenses. I accomplish it by a specifically-different construction and arrangement of the parts. I remove the lower portion of the latch and support the latch wholly upon its pivotal stud. I mass both the substance of the trigger and that of the latch in the plane of the blow from the rotating projection, and I mount the trigger upon the latch by means of a strong and preferably long horizontal pivot, which transmits the blow from the former to the latter without danger of injury to either. The use of my improvement is not attended by such breakages and expenses as it is the object of the improvement to prevent.

My invention first will be described with reference to the accompanying drawings, in which I have illustrated the same embodied in the best form that I have yet contrived, and then will be particularly pointed out in the claims at the close of this specification.

Figure 2:
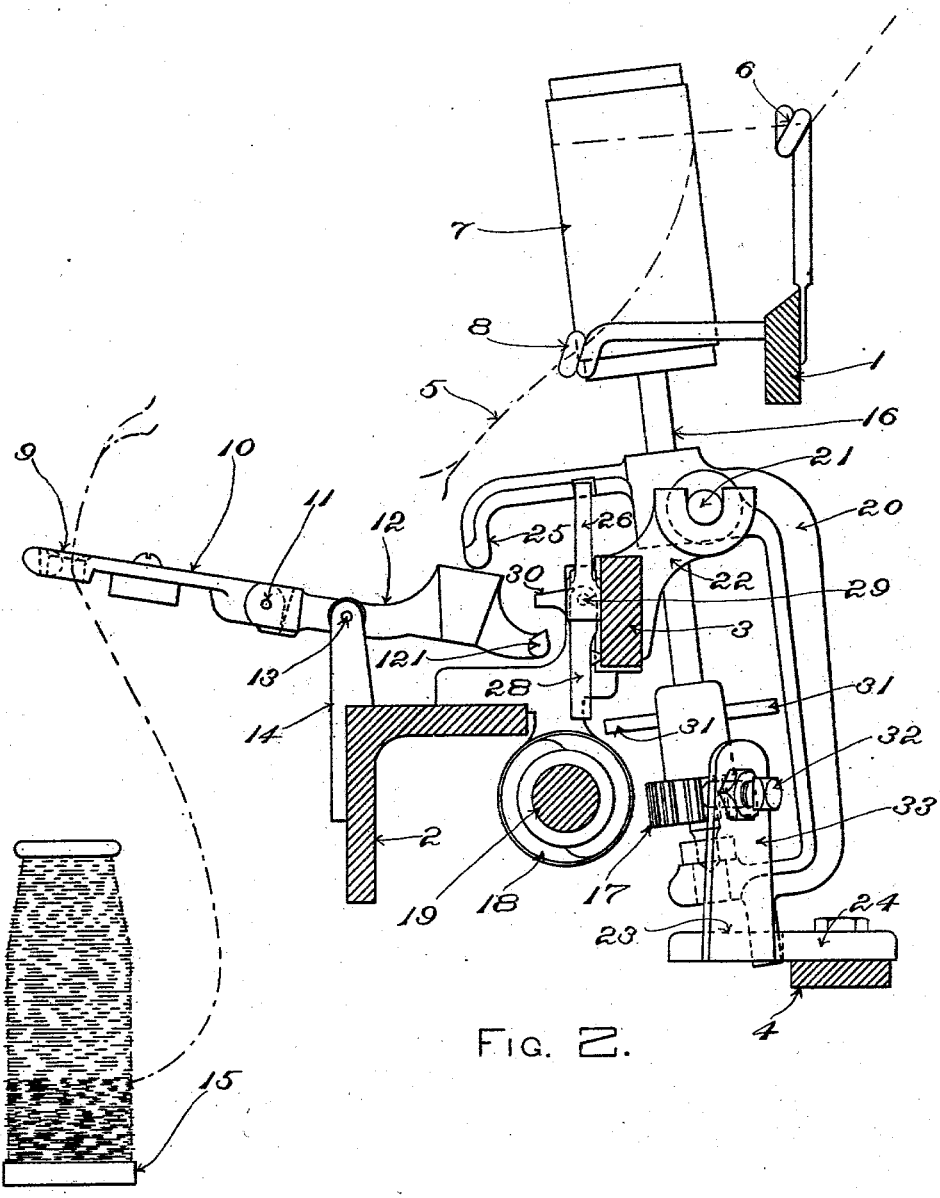
Figure 3:
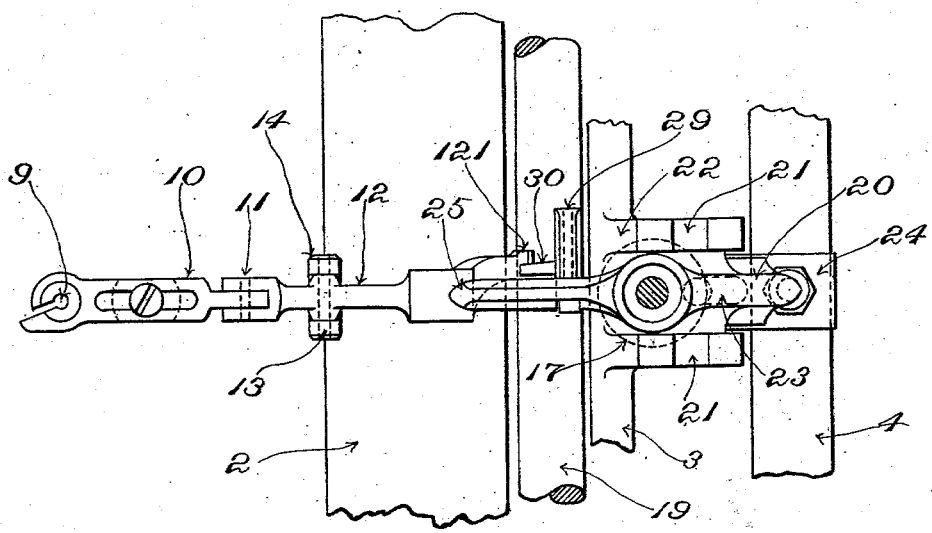
Figure 4:
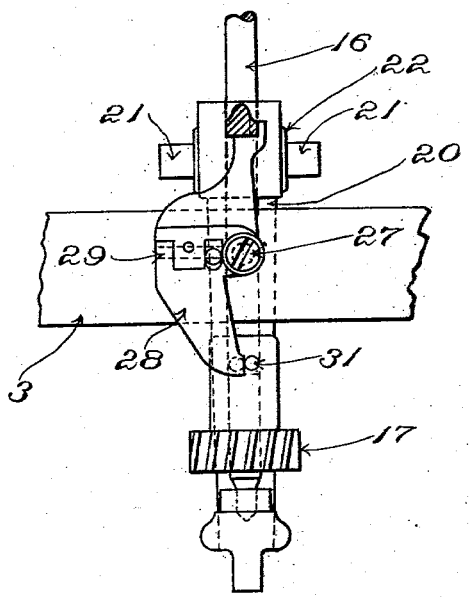

In the drawings, Figure 1 shows in side elevation the said embodiment of the invention, certain rails pertaining to a twisting-frame being represented in vertical cross-section. In this figure the parts occupy their working positions and relations. Fig. 2 is a similar view, but showing the parts in the positions and relations which they assume on the breakage of an end. Fig. 3 is a view in horizontal section on the plane indicated by the dotted line 3 3, Fig. 1, looking downward. Fig. 4 is a front elevation of certain parts, showing the forwardly-projecting arm of the swing-frame in vertical section on line 4 4, Fig. 1.

Having reference to the drawings, 1, 2, 3, and 4 are certain rails of a twisting-frame.

5 is an end to be twisted.

6 is a yarn-guide mounted on rail 1 and through the eye of which the said end 5 passes on its way from the creel to the delivery-roller 7, a second yarn-guide 8 being applied to the said rail 1 and the said end being caused to pass through the eye of said yarn-guide 8 after leaving the delivery-roller.

9 is the usual guide-eye above the twisting-spindle, (not shown,) the said guide-eye being mounted on the arm 10, which last is pivoted at 11 upon the main portion of the detector-lever 12. Arm 10, as usual, is free to be turned upwardly upon its pivotal connection with the said main portion. The detector-lever is pivoted, as at 13, upon a stand 14 on the rail 2.

15 designates the receiving-bobbin, the latter being mounted in practice upon a twisting-spindle. (Not shown.)

16 is the spindle of the delivery-roller 7. It is furnished with a gear or worm wheel 17 for engagement with a driving worm or gear 18 on an actuating-shaft 19. The spindle 16 is mounted in bearings provided on a swing-frame 20, which last is furnished at the upper part thereof with journals or trunnions 21 21, fitting open bearings in a stand 22 on the rail 3. The said journals or trunnions and bearings support the swing-frame with capacity to swing forwardly and rearwardly in a vertical plane. The foot end of the swing-frame works in a slot 23 (indicated by dotted lines in Figs. 1, 2, and 3) in a plate 24, that is affixed to the rail 4. The upper part of the swing-frame has a forwardly-projecting arm 25, which overhangs the rear arm or tail of the detector-lever 12. The said arm 25 and other portions of the swing-frame are made to overbalance the remainder thereof and cause it to assume the position that is represented in Fig. 2 of the drawings when permitted to do so. The parts being in the position that is represented in Fig. 2, if the forward arm of detector-lever 12 be pressed upon the rear arm or tail thereof will act against arm 25 to move the swing-frame into the position that is occupied thereby in Fig. 1, with the gear or worm wheel 17 on the spindle of the delivery-roller in driving engagement with the worm or gear 18 on the actuating-shaft 19. A latch 26 is provided for the purpose of holding the swing-frame in this position. This latch is connected to the rail 3 by a horizontal pivot 27, so as to have capacity to swing transversely in a vertical plane. The upper end of the latch is shaped to engage with the arm 25, and the latch is overbalanced at one side of the pivot to cause the same to gravitate naturally into engagement with the said arm. Hence when arm 25 is raised the latch automatically engages therewith to hold the said arm in its elevated position. (See Figs. 1 and 4.)

For the purpose of enabling the latch to be tripped automatically at the proper times it is furnished with a trip or trigger 28. This trip or trigger is connected with the latch by a horizontal pivot 29 at right angles to pivot 27 and on which the trip or trigger is capable of swinging forward and rearward in the machine. It has a projection 30 extending forwardly and overhanging a portion of the rear arm of detector-lever 12. When said rear arm is raised to restore the swing-frame to its working position, Fig. 1, and after the latch has gravitated into engagement with the arm 25 of the swing-frame a rearward extension 121 of the detector-lever 12 contacts with said projection 30 on the trip or trigger, causing the latter to swing into a position which places it out of the path of rotation of a projection or projections 31 31, herein constituted by oppositely-projecting pins on the spindle of the delivery-roller. (See more particularly Fig. 1.) So long as the forward arm of the detector-lever 12 remains depressed under the action of the end 5 its rear arm holds the trip or trigger 28 out of its normal position and in the position which is shown occupied by it in Fig. 1. Thereby the swing-frame is retained in the position shown in said figure with the driving arrangements of the delivery-roller in driving relations. When, however, the forward arm of the detector-lever 12 is freed from downward pressure, as in consequence of the breakage of the end 5 between the delivery-roller and the receiving-bobbin on the twisting-spindle, its rear arm gravitates downwardly, releasing the trip or trigger 28 and permitting the latter to gravitate into the path of rotation of the projection or projections 31 31 on the spindle of the delivery-roller. The engagement of one of said projections with the said trip or trigger will result in swinging the latch 26 transversely, so as to disengage it from arm 25 of the swing-frame. Thereupon the swing-frame will assume the position represented in Fig. 2, separating the driving arrangements of the delivery-roller.

For the purpose of insuring the stoppage of the revolution of the delivery-roller after the separation of the driving arrangements, as just described, I provide a stop device, which is brought into action at such time. This stop device may assume various forms. It is constituted in the present embodiment of the invention by a screw 32, applied to an upwardly-projecting portion 33 of plate 24. The said screw is disposed in such relative position that when the swing-frame turns into the position occupied by it in Fig. 2 the end of the screw makes contact with one of the teeth of the wheel or gear 17 on the spindle of the delivery-roller.

While I have been particular to describe carefully and fully the construction of the preferred embodiment of my invention as illustrated in the accompanying drawings, it will be clear that such construction may be modified and that equivalents may be substituted without involving a departure from the principles of the invention.

I claim as my invention—

1. In combination, in a stop-motion for preventing waste in twisting and other frames, the delivery-roller, the swing-frame carrying the delivery-roller, the driving-gearing for the delivery-roller, one or more rotating projections, the detector-lever, the latch to hold the swing-frame in working position and the driving-gearing in mesh, the gravitating trip or trigger for engagement by said projection or projections in the rotation of the latter, having its substance in the plane of the blow from the rotating projections, strongly and pivotally mounted on said latch, and moved from its normal position by the contact of the detector-lever therewith, substantially as described.

2. In combination, in a stop-motion for preventing waste in twisting and other frames, the delivery-roller, its spindle having one or more projections, the driving-gearing for the said spindle, the swing-frame carrying the delivery-roller and having the arm, the detector-lever, the latch engaging with the said arm to hold the swing-frame in position to maintain working relations in the driving-gearing, and the trip or trigger, having its substance in the plane of the blow from the rotating projections, movably connected with the said latch, held by the contact of the detector-lever therewith out of the path of said projection or projections, and gravitating into said path when released by the detector-lever, substantially as described.

3. In combination, in a stop-motion for preventing waste in twisting and other frames, the delivery-roller, the swing-frame carrying the delivery-roller, the driving-gearing for the delivery-roller, one or more rotating projections, the detector-lever, the latch to hold the swing-frame in working position and the driving-gearing in working relations, a trip device having its substance in the plane of the blow from the rotating projections, movably connected with the said latch, operated by the detector-lever and moved on the release of the latter into the path of the projection or projections to thereby cause the latch to be tripped, and a stop device acting in the changed position of the swing-frame to arrest the rotation of the delivery-roller, substantially as described.

4. In combination, in a stop-motion for preventing waste in twisting and other frames, the delivery-roller, the swing-frame carrying the delivery-roller, the gear on the roller-spindle, the actuating worm or gear, the projections carried by the roller-spindle, the detector-lever, the latch to hold the swing-frame in working position and the driving parts in working relations, the trip or trigger having its substance in the plane of the blow from the rotating projections, movably connected with the said latch, operated by the detector-lever and permitted to move, on release of the latter, into the path of the projections on the spindle, to thereby cause the latch to be tripped, and the fixed stop to engage with the gear on the spindle, substantially as described.

5. In combination, in a stop-motion for preventing waste in twisting and other frames, the delivery-roller, the swing-frame carrying the delivery-roller, the gear on the roller-spindle, the actuating worm or gear, the projections carried by the roller-spindle, the detector-lever, the latch to hold the swing-frame in working position and the driving parts in working relations, the trip or trigger having its substance in the plane of the blow from the rotating projections, pivotally mounted on said latch, held by the contact of the detector-lever therewith out of the path of the said projections, and gravitating into said path when released by the detector-lever, and the fixed stop to engage with the gear on the spindle, substantially as described.

In witness whereof I affix my signature in the presence of two witnesses.

CHANNING WHITAKER.

Witnesses:
MARY CAVERLY,
JENNIE E. WHITNEY.